United States Patent
Takahashi (10) Patent No.: US 9,648,238 B2
(45) Date of Patent: May 9, 2017

(54) IMAGE PROCESSING DEVICE THAT SYNTHESIZES A PLURALITY OF IMAGES, METHOD OF CONTROLLING THE SAME, STORAGE MEDIUM, AND IMAGE PICKUP APPARATUS

(71) Applicant: CANON KABUSHIKI KAISHA, Tokyo (JP)

(72) Inventor: Yoichi Takahashi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/867,352

(22) Filed: Sep. 28, 2015

(65) Prior Publication Data
US 2016/0100103 A1    Apr. 7, 2016

(30) Foreign Application Priority Data

Oct. 6, 2014    (JP) .................................. 2014-205398

(51) Int. Cl.
| | |
|---|---|
| H04N 5/232 | (2006.01) |
| G06T 5/50 | (2006.01) |
| G06T 7/20 | (2017.01) |
| H04N 5/235 | (2006.01) |

(52) U.S. Cl.
CPC .......... *H04N 5/23254* (2013.01); *G06T 5/50* (2013.01); *G06T 7/2013* (2013.01); *H04N 5/2355* (2013.01); *H04N 5/23267* (2013.01)

(58) Field of Classification Search
None
See application file for complete search history.

(56) References Cited

U.S. PATENT DOCUMENTS

2013/0177080 A1*    7/2013    Nakashima .......... H04N 19/521
                                                                375/240.14

FOREIGN PATENT DOCUMENTS

| JP | 2003-259184 A | 9/2003 |
| JP | 2008-010958 A | 1/2008 |

* cited by examiner

*Primary Examiner* — Twyler Haskins
*Assistant Examiner* — Angel L Garces-Rivera
(74) *Attorney, Agent, or Firm* — Fitzpatrick, Cella, Harper & Scinto (57) ABSTRACT

An image processing device that is capable of synthesizing a plurality of images by accurately correcting an image shift even in a photographing scene with a lot of external disturbances, such as noise. An image processing device synthesizes a plurality of images obtained by photographing an object that moves at a predetermined speed to thereby obtain a synthesized image. Each of the plurality of images is divided into a plurality of blocks, and a motion vector is detected from each of the blocks. Selection from the motion vectors is performed based on a focal length and an exposure interval applied when the plurality of images are obtained. Synthesis processing is performed by aligning the plurality of images based on the selected motion vectors, whereby the synthesized image is obtained.

13 Claims, 8 Drawing Sheets

IMAGE PROCESSING DEVICE THAT SYNTHESIZES A PLURALITY OF IMAGES, METHOD OF CONTROLLING THE SAME, STORAGE MEDIUM, AND IMAGE PICKUP APPARATUS

BACKGROUND OF THE INVENTION

Field of the Invention

The present invention relates to an image processing device, a method of controlling the same, a storage medium, and an image pickup apparatus, and more particularly to an image processing device for synthesizing a plurality of images.

Description of the Related Art

In general, when photographing celestial objects, exposure over a long time period e.g. 30 seconds or one minute is performed by taking into consideration the fact that the amount of light from each star is very small. However, each celestial object performs diurnal motion in accordance with the Earth's rotation, and hence the long-time exposure results in forming light trails instead of forming spot images of stars (celestial object).

To avoid formation of light trails, a plurality of images are photographed with such an exposure time period as will prevent stars from forming light trails, the shift of each star between images caused by the diurnal motion of the star is corrected, and then the plurality of images are synthesized into one image. This makes it possible to photograph celestial objects without changing images of stars into light trails, in a manner similar to a case where photographing is performed with long-time exposure.

When correcting the shift of each star between a plurality of images, each of the images is divided into a plurality of blocks, and motion vectors are calculated with respect to each block. Then, the shift is corrected by calculating movement of the image based on the motion vectors.

For example, there has been proposed an image pickup apparatus that determines a total exposure time period according to light intensity of celestial bodies which are an object to be photographed, performs divided exposure N times each over such a time period as will prevent stars from forming light trails, and corrects an image shift (see Japanese Patent Laid-Open Publication No. 2003-259184).

Further, there has been proposed an image pickup apparatus that divides each of a plurality of images into a plurality of blocks, detects, if any block has isolated points each having pixel values different from those of surrounding pixels, motion vectors with respect to the block having isolated points, and corrects an image shift (see Japanese Patent Laid-Open Publication No. 2008-10958).

Incidentally, when calculating a motion vector, there is a case where a motion vector cannot be accurately detected with respect to each of the blocks due to the influence of an external disturbance, such as noise. In this case, according to the methods described in Japanese Patent Laid-Open Publication No. 2003-259184 and Japanese Patent Laid-Open Publication No. 2008-10958, a motion vector detected at a low accuracy is used in calculating the movement of an image. As a result, the image shift cannot be accurately corrected, so that the images are sometimes synthesized in a blurred state.

SUMMARY OF THE INVENTION

The present invention provides an image processing device that is capable of synthesizing a plurality of images by accurately correcting an image shift even in a photographing scene with a lot of external disturbances, such as noise, a method of controlling the same, a storage medium, and an image pickup apparatus.

In a first aspect of the present invention, there is provided an image processing device that synthesizes a plurality of images obtained by photographing an object that moves at a predetermined speed to thereby obtain a synthesized image, comprising a detection unit configured to divide each of the plurality of images into a plurality of blocks, and detect a motion vector from each of the blocks, a selection unit configured to select from the motion vectors, based on a focal length and an exposure interval which are applied when each of the plurality of images is obtained, and a synthesis unit configured to perform synthesis processing by aligning the plurality of images based on motion vectors selected by the selection unit to thereby obtain the synthesized image.

In a second aspect of the present invention, there is provided an image pickup apparatus comprising an image pickup unit configured to photograph an object that moves at a predetermined speed to thereby obtain a plurality of images, an image processing device configured to synthesize the plurality of images to thereby obtain a synthesized image, and a recording unit configured to record the synthesized image obtained by the image processing device in a memory, wherein the image processing device includes a detection unit configured to divide each of the plurality of images into a plurality of blocks, and detect a motion vector from each of the blocks, a selection unit configured to select from the motion vectors, based on a focal length and an exposure interval which are applied when each of the plurality of images is obtained, and a synthesis unit configured to perform synthesis processing by aligning the plurality of images based on motion vectors selected by the selection unit to thereby obtain the synthesized image.

In a third aspect of the present invention, there is provided a method of controlling an image processing device that synthesizes a plurality of images obtained by photographing an object that moves at a predetermined speed to thereby obtain a synthesized image, comprising dividing each of the plurality of images into a plurality of blocks, and detecting a motion vector from each of the blocks, selecting from the motion vectors, based on a focal length and an exposure interval which are applied when each of the plurality of images is obtained, and performing synthesis processing by aligning the plurality of images based on motion vectors selected by said selecting to thereby obtain the synthesized image.

In a fourth aspect of the present invention, there is provided a non-transitory computer-readable storage medium storing a computer-executable program for executing a method of controlling an image processing device that synthesizes a plurality of images obtained by photographing an object that moves at a predetermined speed to thereby obtain a synthesized image, wherein the method comprises dividing each of the plurality of images into a plurality of blocks, and detecting a motion vector from each of the blocks, selecting from the motion vectors, based on a focal length and an exposure interval which are applied when each of the plurality of images is obtained, and performing synthesis processing by aligning the plurality of images based on motion vectors selected by said selecting to thereby obtain the synthesized image.

According to the present invention, it is possible to perform synthesis processing by accurately correcting an image shift even in a photographing scene with a lot of external disturbances, such as noise.

Further features of the present invention will become apparent from the following description of exemplary embodiments (with reference to the attached drawings).

BRIEF DESCRIPTION OF THE DRAWINGS

FIGS. 5A to 5D are diagrams useful in explaining detection of motion vectors, performed by the camera shown in FIG. 1, in which FIG. 5A shows a reference luminance image, FIG. 5B shows an object luminance image, FIG. 5C shows a result of feature block selection, and FIG. 5D shows a result of motion vector detection.

FIGS. 7A to 7C are diagrams useful in explaining the motion vector selection process which is performed by the digital camera shown in FIG. 1, in which FIG. 7A shows a result of motion vector detection, FIG. 7B shows a result of motion vector selection using an object maximum movement amount, and FIG. 7C shows a result of motion vector selection using a degree of variation in the scalar amount in the motion vectors, which is performed further on the result of motion vector selection shown in FIG. 7B.

FIGS. 8A and 8B are diagrams useful in explaining selection ranges for selecting motion vectors when the motion vector selection process is performed by the digital camera shown in FIG. 1, in which FIG. 8A shows a selection range of motion vectors, which is set by the object maximum movement amount, and FIG. 8B shows a selection range of motion vectors, which is set by the degree of variation in the scalar amount in the motion vectors.

DESCRIPTION OF THE EMBODIMENTS

The present invention will now be described in detail below with reference to the accompanying drawings showing embodiments thereof.

Figure 1:
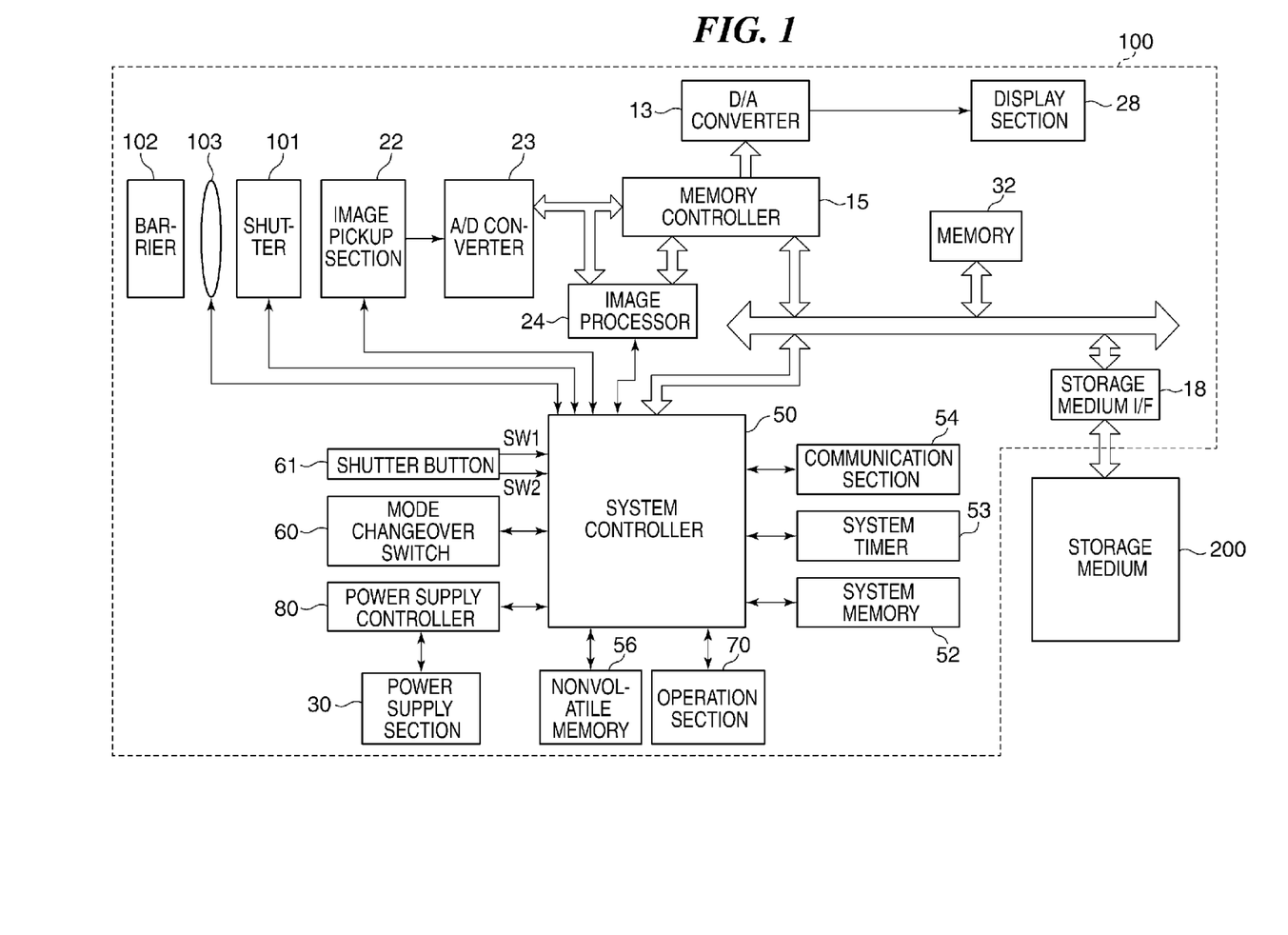
FIG. 1 is a block diagram of a digital camera as an image pickup apparatus including an image processing device according to an embodiment of the present invention.

FIG. 1 is a block diagram of an image pickup apparatus including an image processing device according to an embodiment of the present invention.

The image pickup apparatus shown in FIG. 1 is e.g. a digital camera (hereinafter simply referred to as "the camera") 100, and has a photographic lens unit (hereinafter simply referred to as "the photographic lens") 103. This photographic lens 103 is a lens group including a zoom lens and a focus lens. A shutter 101 is disposed downstream of the photographic lens 103, and is provided with a diaphragm function.

An image pickup section 22 is disposed downstream of the shutter 101. The image pickup section 22 is an image pickup sensor including an image pickup device, such as a CCD or CMOS element, that converts an optical image (object image) to an electric signal (analog signal). An analog-to-digital converter (A/D converter) 23 converts the analog signal output from the image pickup section 22 to a digital signal.

A barrier 102 covers an image pickup system including the photographic lens 103 to thereby prevent the image pickup system including the photographic lens 103, the shutter 101, and the image pickup section 22 from being soiled and damaged.

An image processor 24 performs predetermined resizing processing including pixel interpolation and size reduction, and color conversion, on the digital signal (image data) output from the analog-to-digital converter 23 or image data from a memory controller 15. Further, the image processor 24 sets one of two image data items obtained from the memory controller 15 as a reference image data item, and detects motion vectors indicative of the direction and magnitude of a shift of the other image data item with respect to the reference image data item.

Further, the image processor 24 performs predetermined computation processing using image data obtained through photographing, and then a system controller 50 performs exposure control and distance measurement control based on computation results obtained by the image processor 24. With these controls, the system controller 50 performs TTL (through-the-lens) AF (autofocus) processing, AE (auto exposure) processing, and EF (electronic flash pre-emission) processing.

Furthermore, the image processor 24 performs predetermined computation processing using image data obtained through photographing, and performs TTL AWB (auto white balance) processing based on the computation results.

The image data output from the analog-to-digital converter 23 is written in a memory 32 via the image processor 24 and the memory controller 15 or via the memory controller 15 alone. The memory 32 stores image data obtained through photographing and display image data to be displayed on a display section 28. Note that the memory 32 has a sufficiently large storage capacity for storing a predetermined number of still images, or a moving image and sound recorded for a predetermined time period. Further, the memory 32 also serves as an image display memory (video memory).

A digital-to-analog converter (D/A converter) 13 converts the display image data stored in the memory 32 to an analog image signal, and sends the analog image signal to the display section 28. As a consequence, the display section 28 displays an image corresponding to the display image data. Thus, the display image data stored in the memory 32 is displayed on the display section 28 via the digital-to-analog converter 13. Note that the display section 28 is e.g. an LCD.

The image data once converted from analog to digital by the analog-to-digital converter 23 and stored in the memory 32 is converted from digital to analog by the digital-to-analog converter 13, and is sequentially transferred to the display section 28 for display thereon, whereby the display section 28 functions as an electronic viewfinder to perform through-image display (live view display).

A nonvolatile memory 56 stores data in an electrically erasable and recordable manner, and is implemented e.g. by an EEPROM (electrically erasable programmable read-only memory). The nonvolatile memory 56 stores constants for use in operation of the system controller 50, programs, and so forth. In the example illustrated herein, the programs are those that perform various processes described hereinafter.

The system controller 50 controls the overall operation of the camera 100. The system controller 50 executes programs stored in the nonvolatile memory 56 to thereby perform various processes described hereinafter. A system memory 52 is e.g. a RAM, and the constants and variables for use in operation of the system controller 50, the programs read from the nonvolatile memory 56, and so forth are loaded in the system memory 52. Note that the system controller 50 controls the memory 32, the digital-to-analog converter 13, the display section 28, and so forth, to thereby perform display control.

A system timer 53 is a timer for counting time used in various controls and time of an internal clock. A mode changeover switch 60, a shutter button 61, and an operation section 70 are each used for inputting various operation instructions to the system controller 50.

The mode changeover switch 60 is used for switching the operation mode of the system controller 50 between a still image-recording mode, a moving image-recording mode, a reproduction mode, and so forth. The still image-recording mode includes an auto photographing mode, an auto scene determination mode, a manual mode, various scene modes each having photographing settings configured on a photographing scene-by-photographing scene basis, a program AE mode, and a custom mode.

By using the mode changeover switch 60, it is possible to directly change the operation mode to one of modes included in a menu button. Alternatively, the configuration may be such that after switching to the menu button is once performed using the mode changeover switch 60, the operation mode may be changed to one of modes included in the menu button, using another operation member. Similarly, the moving image-recording mode may also include a plurality of modes.

A first shutter switch is turned on by half operation of the shutter button 61, i.e. when the shutter button 61 is brought to a half pressed state (photographing preparation instruction state). As a consequence, a first shutter switch signal SW1 is delivered to the system controller 50. In response to the first shutter switch signal SW1, AF (auto focus) processing, AE (auto exposure) processing, AWB (auto white balance) processing, and EF (electronic flash pre-emission) processing and so forth are started under the control of the system controller 50.

A second shutter switch is turned on by complete operation of the shutter button 61, i.e. when the shutter button 61 is brought to a fully pressed state (photographing instruction state). As a consequence, a second shutter switch signal SW2 is delivered to the system controller 50. In response to the second shutter switch signal SW2, the system controller 50 starts a sequence of photographing processing from reading of an analog signal from the image pickup section 22 to writing of image data in a storage medium 200.

By selectively operating various function icons displayed on the display section 28 or by like other operations, functions are assigned to respective operation members of the operation section 70 on a screen-by-screen basis, as required, whereby the operation members come to serve as respective function buttons. The function buttons include, for example, a stop button, a return button, an image scroll button, a jump button, a narrow-down button, and an attribute change button. When the menu button is pressed, for example, a menu screen for configuring various settings is displayed on the display section 28, which enables a user to intuitively configure various settings, using the menu screen displayed on the display section 28, and a four-way button and a set button.

The operation section 70 is provided with a controller wheel as one of the operation members, the operation section 70 as well as the four-way button is used e.g. for instructing a selected item.

When the controller wheel is rotated, an electric pulse signal is generated according to an amount of the rotation, and the system controller 50 controls the camera 100 based on the pulse signal. The system controller 50 can determine, based on the pulse signal, the angle and number of turns through which the controller wheel is rotated.

Note that any operation member may be employed as the controller wheel insofar as it allows detection of a rotational operation. For example, the controller wheel may be a dial-type operation member configured to be rotated in accordance with a rotational operation by the user, and thereby generates a pulse signal. Further, the controller wheel may be an operation member implemented by a touch sensor, and in this case, the controller wheel itself is not rotated but a rotational motion of a user's finger or the like on the controller wheel is detected (so-called touch wheel).

A power supply controller 80 is comprised of a battery detection circuit, a DC-DC converter, and a switch circuit for use in switching between blocks to be supplied with electric power, and detects whether or not a battery is mounted, a type of the battery, and a remaining charge of the battery. Further, the power supply controller 80 controls the DC-DC converter based on a detection result and an instruction from the system controller 50 to supply a required voltage to each of the components including the storage medium 200 over a required time period.

A power supply section 30 includes e.g. a primary battery, such as an alkaline battery or a lithium battery, or a secondary battery, such as an NiCd battery, an NiMH battery, or an Li battery, as well as an AC adapter. The power supply section 30 supplies power to the power supply controller 80. A storage medium interface 18 is an interface with the storage medium 200, such as a memory card (semiconductor memory) or a hard disk. The storage medium 200 stores image data obtained through photographing.

A communication section 54 is connected to an external device by a wireless channel or a cable. The communication section 54 transmits and receives image data and voice data to and from the external device under the control of the system controller 50. The communication section 54 can be connected to a wireless LAN (Local Area Network) and the Internet.

The communication section 54 can transmit image data (including through images) obtained through photographing and image data recorded in the storage medium 200 to the external device. Further, the communication section 54 can receive image data and other various information from the external device.

Figure 2:
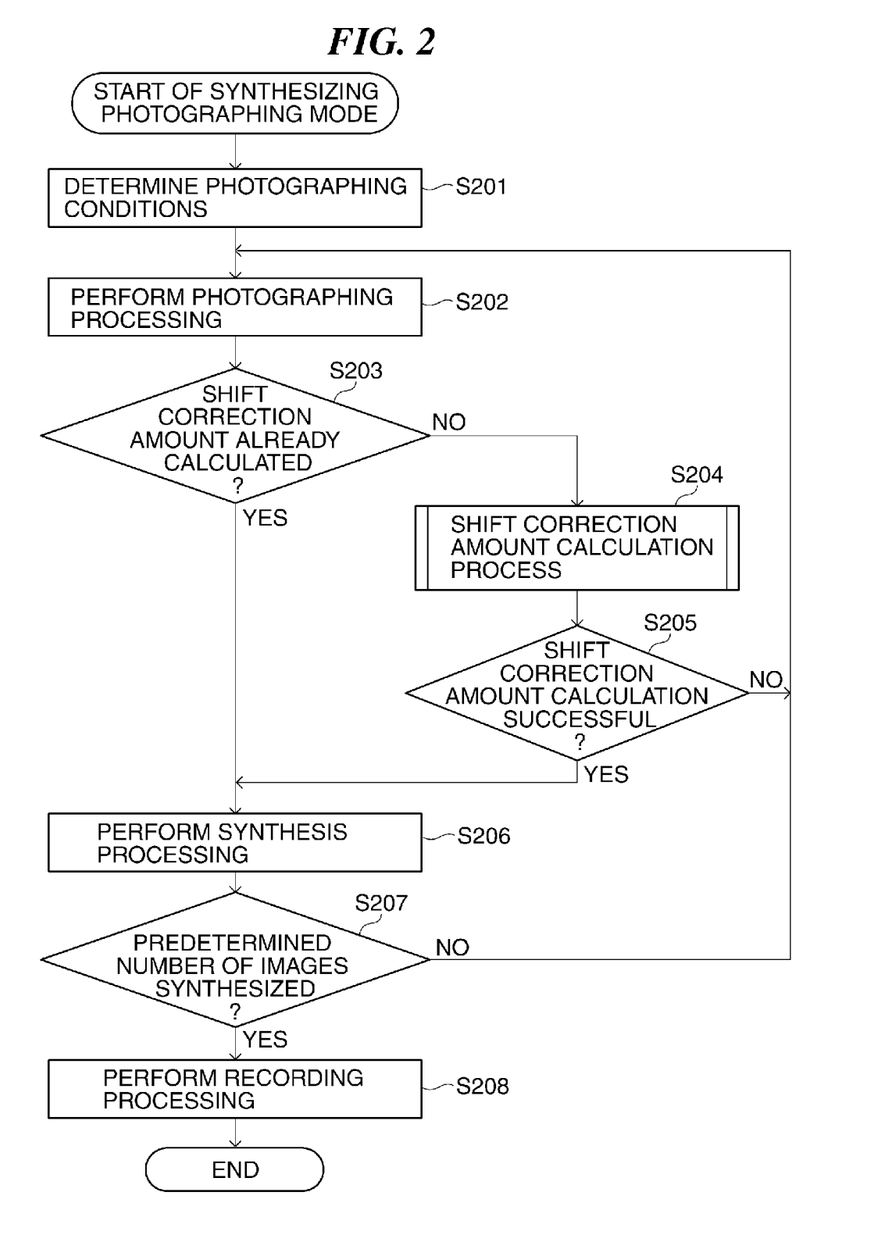
FIG. 2 is a flowchart of a photographing process performed in a synthesizing photographing mode by the digital camera shown in FIG. 1.

FIG. 2 is a flowchart of a photographing process performed in a synthesizing photographing mode, by the camera 100 shown in FIG. 1.

The photographing process in FIG. 2 is performed by the system controller 50 which reads out a program therefor stored in the nonvolatile memory 56, loads the program into the system memory 52, and executes the same.

The camera 100 shown in FIG. 1 is provided with a starry sky synthesis mode as one of the still image-recording modes (also referred to as the synthesizing photographing mode). In the starry sky synthesis mode, a plurality of photographing operations are performed by the camera 100. Then, the shift between a plurality of images obtained through photographing is corrected with respect to stars (celestial objects), and then the images are synthesized to thereby generate one synthesized image.

The photographing process in the starry sky synthesis mode is started e.g. by receiving a photographing instruction after setting the operation mode of the camera 100 to the starry sky synthesis mode. Further, in the following description, it is assumed that the camera 100 is fixed to a tripod, and is oriented in a direction of stars as an object.

When the starry sky synthesis mode is started, the system controller 50 determines photographing conditions, including an exposure time period to be taken for one photographing operation, a required number of images to be synthesized (i.e. a predetermined number of images), and a gain (step S201). For example, the system controller 50 determines the exposure time period for an object, the required number of images to be synthesized, and the gain, which are to be applied when the user half-presses the shutter button 61 to turn on the first shutter switch. In doing this, the system controller 50 determines the exposure time period as such a time period that will prevent stars from forming light trails in a photographed image.

Then, when the user fully presses the shutter button 61 to turn on the second shutter switch, the system controller 50 photographs two images of the object according to the above-mentioned exposure time period (step S202: photographing processing).

In this step, the system controller 50 causes the analog-to-digital converter 23 to covert an analog signal output from the image pickup section 22, which is obtained by exposure, to a digital signal, and output the digital signal (image data) to the image processor 24. Then, the system controller 50 causes the image processor 24 to convert the image data to YUV data, and perform noise reduction processing and edge emphasis processing on the data.

Then, the system controller 50 stores the two output image data items obtained by the image processor 24 via the memory controller 15 in the memory 32. Further, the system controller 50 obtains an exposure start time associated with each image data item from the system timer 53, and stores the obtained exposure start time in the memory 32 in association with each associated image data item. In doing this, the system controller 50 records information on a focal length obtained by the AF control, in the memory 32.

Next, the system controller 50 determines whether or not a shift correction amount has already been calculated (step S203). If a shift correction amount has not been calculated yet (NO to the step S203), the system controller 50 sets the latest one of image data items stored in the memory 32 as a reference image data item to be used in calculating the shift correction amount. Then, the system controller 50 performs a shift correction amount calculation process for calculating the shift correction amount using the reference image data item (step S204). Although in this calculation, affine coefficients, referred to hereinafter, are used as the shift correction amount, magnitudes (amounts of shifts) in horizontal and vertical directions may be used as the shift correction amount.

After performing the shift correction amount calculation process in the step S204, the system controller 50 determines whether or not the calculation of the shift correction amount is successful (step S205). If the calculation of the shift correction amount is unsuccessful (NO to the step S205), the system controller 50 returns to the step S202, and performs photographing processing.

In this case, the system controller 50 performs one photographing operation, and stores image data newly obtained through photographing in the memory 32, by overwriting one of the two image data items stored in the memory 32, which is older in exposure start time.

On the other hand, if the calculation of the shift correction amount is successful (YES to the step S205), the system controller 50 proceeds to a step S206. Note that if the shift correction amount has already been calculated (YES to the step S203), the system controller 50 directly proceeds to the step S206.

In the step S206, the system controller 50 normalizes the shift correction amount to a movement amount per unit time. Then, the system controller 50 calculates a correction amount based on a difference between the exposure start times stored in the memory 32 in association with the two image data items to be synthesized, respectively, and the above-mentioned movement amount.

Next, the system controller 50 sets one of the image data items stored in the memory 32, which is associated with the latest exposure start time, as the reference image data item. The system controller 50 causes the image processor 24 to perform synthesis processing by aligning the position of the other of the images (older image) to the reference image data item using the above-mentioned correction amount. When synthesis processing is completed, the system controller 50 stores the current number of synthesized images in the memory 32.

Then, the system controller 50 determines whether or not the number of synthesized images reaches the predetermined number which is the required number of images to be synthesized (step S207). If the number of synthesized images is less than the predetermined number (NO to the step S207), the system controller 50 returns to the step S202.

On the other hand, if the number of synthesized images reaches the predetermined number (YES to the step S207), the system controller 50 records the synthesized image (synthesized image data) processed by the image processor 24 in the storage medium 200 (step S208). Then, the system controller 50 terminates the photographing process in the starry sky synthesis mode.

Figure 3:
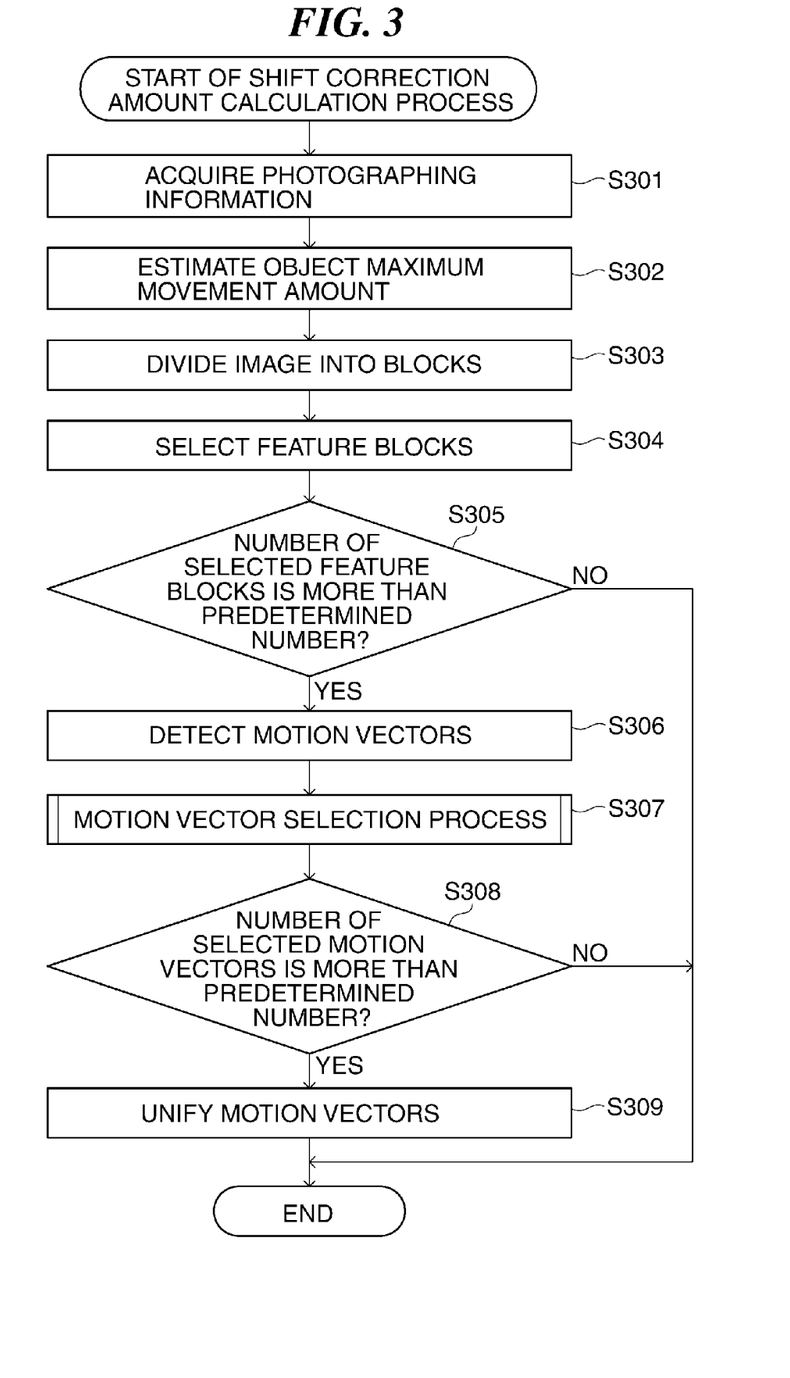
FIG. 3 is a flowchart of a shift correction amount calculation process which is performed in a step of the photographing process shown in FIG. 2.

FIG. 3 is a flowchart of the shift correction amount calculation process performed in the step S204 of the process in FIG. 2.

In the shift correction amount calculation process, the system controller 50 calculates the shift correction amount using the two image data items to be synthesized which are stored in the memory 32.

At the start of the shift correction amount calculation process, the system controller 50 reads out the exposure start times and focal lengths at the exposure start time, which are associated with the two image data items to be synthesized, respectively, from the memory 32 as photographing information (step S301). Then, the system controller 50 estimates the maximum movement amount of the object based on the exposure start times and the focal lengths (step S302).

Now, a description will be given of a method of estimating the maximum movement amount of an object in a case where the object is a star.

Figure 4:
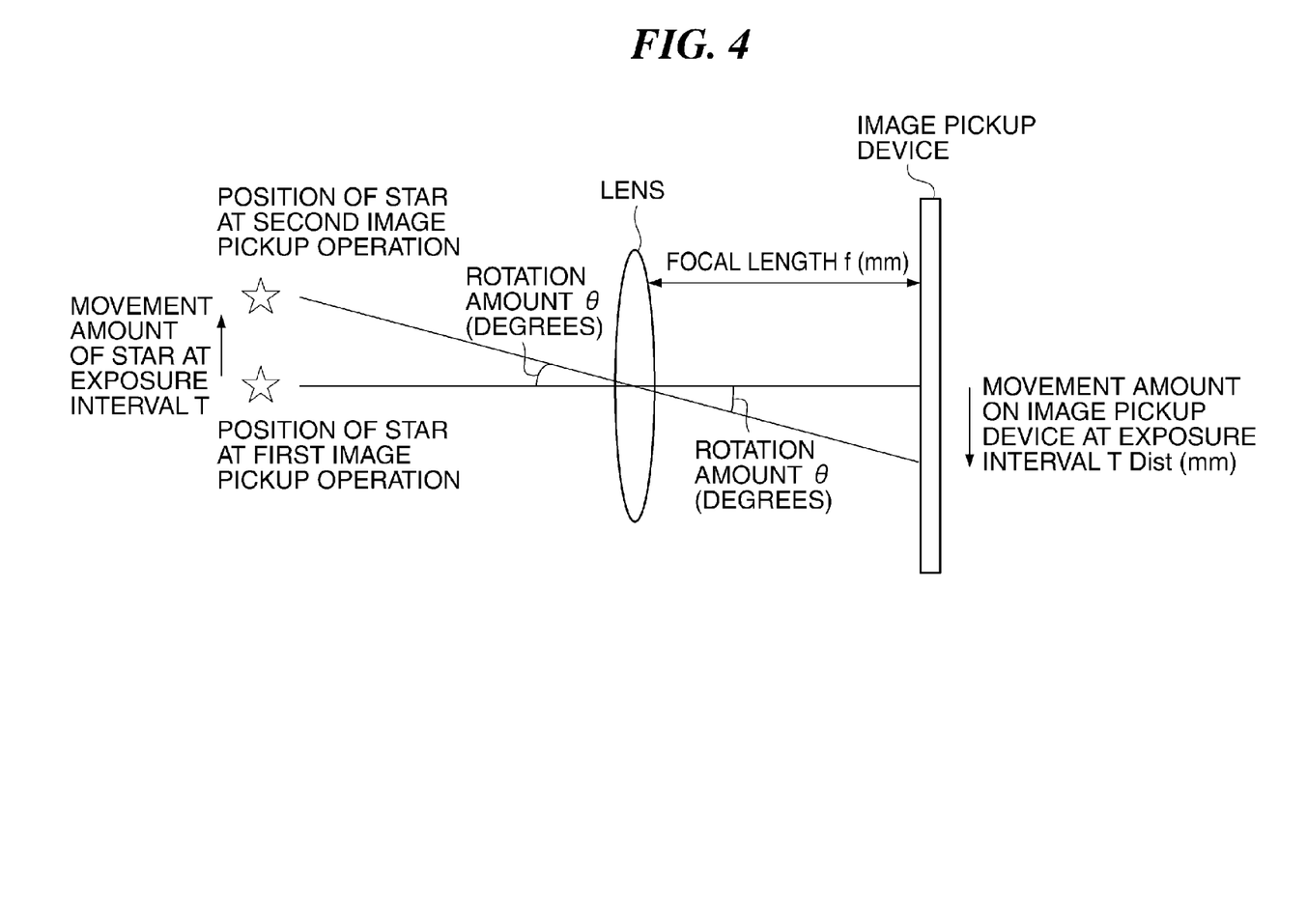
FIG. 4 is a diagram showing a relationship between the movement of a star on the celestial equator and an image pickup section (image pickup device).

FIG. 4 is a diagram showing a relationship between the movement of a star on the celestial equator and the image pickup section 22 (image pickup device).

The celestial equator is a line connecting points where the equatorial plane of the Earth extended to the sky intersects with the celestial sphere. Each star moves by the diurnal movement thereof, and a star (celestial object) on the celestial equator moves fastest. On the celestial equator, the star rotates through 360 degrees per 24 hours, and hence a rotation amount θs per one second (degree/second) is calculated by the following equation (1)

$$\theta s = 360/(24 \times 60 \times 60) \qquad (1):$$

Assuming that the exposure start times associated with the two image data items to be synthesized, respectively, in the order of earlier exposure start times, are represented by T1 and T2 (sec), an exposure interval T (sec) between the two image data items is calculated by the following equation (2):

$$T = T2 - T1 \qquad (2)$$

Then, the rotation amount θ (degrees) of the star per exposure interval between the two image data items is given by the following equation (3):

$$\theta = \theta s \times T \qquad (3)$$

Now, assuming that the above-mentioned focal length is represented by f (mm), the movement amount Dist (mm) of the star on the image pickup device is given by the following equation (4):

$$\text{Dist} = f \times \tan \theta \qquad (4)$$

By converting the movement amount Dist to the number of pixels (pixel number) of the image pickup device, the maximum value $\text{Dist}_{max}$ (pixels) of the movement amount which can be assumed by the star between the two image data items can be determined.

The system controller 50 calculates the maximum value $\text{Dist}_{max}$ using the equations (1) to (4), which are stored in the nonvolatile memory 56, and stores the calculated maximum value $\text{Dist}_{max}$ in the memory 32 as an object maximum movement amount (maximum amount of the movement amount of an object).

Although the method of estimating the maximum movement amount of a star on the celestial equator has been described, the maximum movement amount of a star in a different direction, such as a star around the north celestial pole, may be determined using a GPS, an azimuth sensor, or the like. Further, although the method of estimating the object maximum movement amount in the case where the object is a star has been described, the estimation method can also be applied to estimation of the maximum movement amount of an object that moves at a constant speed, such as an airplane, e.g. in a case where the maximum movement amount the object is determined by acquiring a moving speed of the object from the communication section 54.

Referring again to FIG. 3, the system controller 50 stores a block frame formed of M×N pixels (M and N each represent an integer equal to 1 or more) in the memory 32, and performs block division (step S303). More specifically, the system controller 50 sets one of the image data items stored in the memory 32, which is the latest in exposure start time, as a reference image data item. Then, the system controller 50 outputs a luminance image (hereinafter referred to as the reference luminance image) indicative of a luminance signal of the reference image data item to the image processor 24, and causes the image processor 24 to perform edge extraction.

For example, the system controller 50 causes the image processor 24 to perform high-pass filter processing on the reference luminance image so as to extract edges of the reference luminance image. Then, the system controller 50 applies the block frame stored in the memory 32 to the reference luminance image to thereby divide the reference luminance image into a plurality of blocks.

Then, the system controller 50 determines whether or not a total sum of respective signal levels of edges extracted in each block is larger than a first threshold value $I_{TH}$ set in advance for detecting a motion vector. If the total sum of the respective signal levels of the edges is not larger than the first threshold value $I_{TH}$, it is determined that the block does not have a feature large enough to be used as a reference of detection of a shift between the images, and hence it is difficult to detect a motion vector. On the other hand, if the total sum of the respective signal levels of the edges exceeds the first threshold value $I_{TH}$, the system controller 50 selects the block as a feature block (step S304).

Although in the above description, the feature block is selected based on the total sum of the signal levels of edges extracted on a block-by-block basis, a block which is high in luminance contrast may be selected as a feature block.

Then, the system controller 50 counts the number of selected feature blocks. Then, the system controller 50 determines whether or not the number of feature blocks is larger than a second threshold value $NB_{TH}$ set in advance (step S305).

If the number of feature blocks is not larger than the second threshold value $NB_{TH}$ (NO to the step S305), the system controller 50 judges that the calculation of the shift correction amount has failed, and terminates the shift correction amount calculation process. On the other hand, if the number of feature blocks is larger than the second threshold value $NB_{TH}$ (YES to the step S305), the system controller 50 sends the reference luminance image to the image processor 24.

Then, the system controller 50 sets the other of the two image data items stored in the memory 32, which is not the reference image data item, as a target image data item, sends the luminance image of the target image data item (hereinafter referred to as the target luminance image) to the image processor 24, and causes the image processor 24 to detect motion vectors (step S306).

Figure 5A:
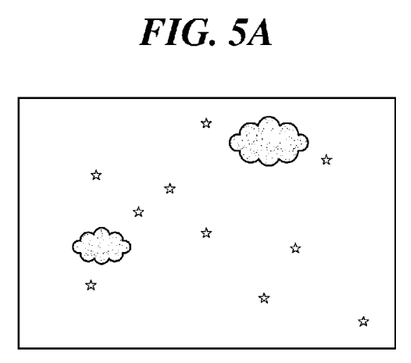
Figure 5B:
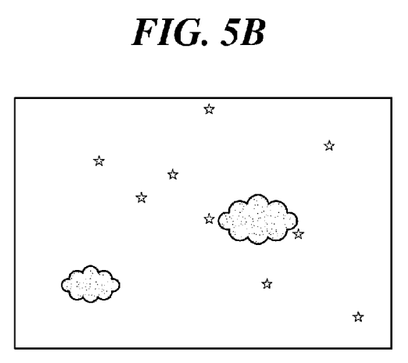
Figure 5C:
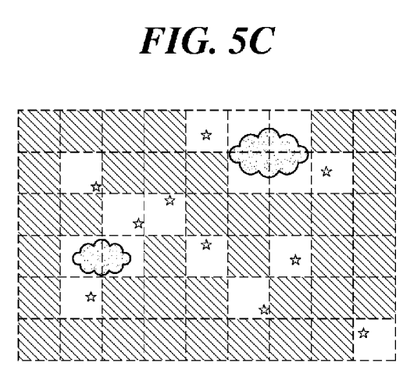
Figure 5D:
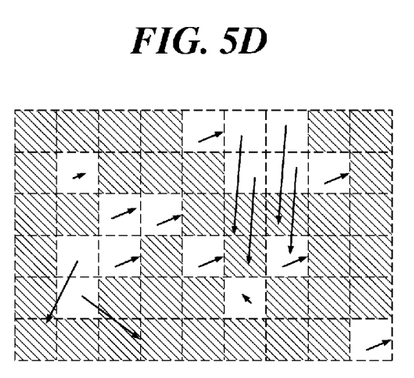

FIGS. 5A to 5D are diagrams useful in explaining detection of motion vectors, which is performed by the camera 100 shown in FIG. 1. FIG. 5A shows the reference luminance image, FIG. 5B shows the target luminance image, FIG. 5C shows a result of feature block selection, and FIG. 5D shows a result of motion vector detection.

Let it be assumed that processing for selecting a feature block has been performed on the reference luminance image shown in FIG. 5A, in the above described manner, a result of feature block selection as shown in FIG. 5C is obtained. In FIG. 5C, blocks each indicated by a white background are the feature blocks.

The system controller 50 causes the image processor 24 to perform pattern matching for each of the feature blocks against the target luminance image shown in FIG. 5B. Then, the system controller 50 causes the image processor 24 to detect a motion vector on a feature block-by-feature block basis (see FIG. 5D). In doing this, the system controller 50 sets a search range for use in pattern matching, to the image processor 24, such that the search range is a range from the center of the feature block within e.g. two times the object maximum movement amount in each of the horizontal and vertical directions.

Note that, for motion vector detection, the search range is only required to be set to be a wider range than within the object maximum movement amount, and hence for example, the system controller 50 may obtain a correction amount for the search range as a fixed value from the nonvolatile memory 56, and set the search range by adding the obtained fixed value to the object maximum movement amount.

Next, the system controller 50 performs a motion vector selection process for selecting motion vectors to be used for the calculation of the correction amount, from the detected motion vectors, according to the object maximum movement amount stored in the memory 32 (step S307).

Figure 6:
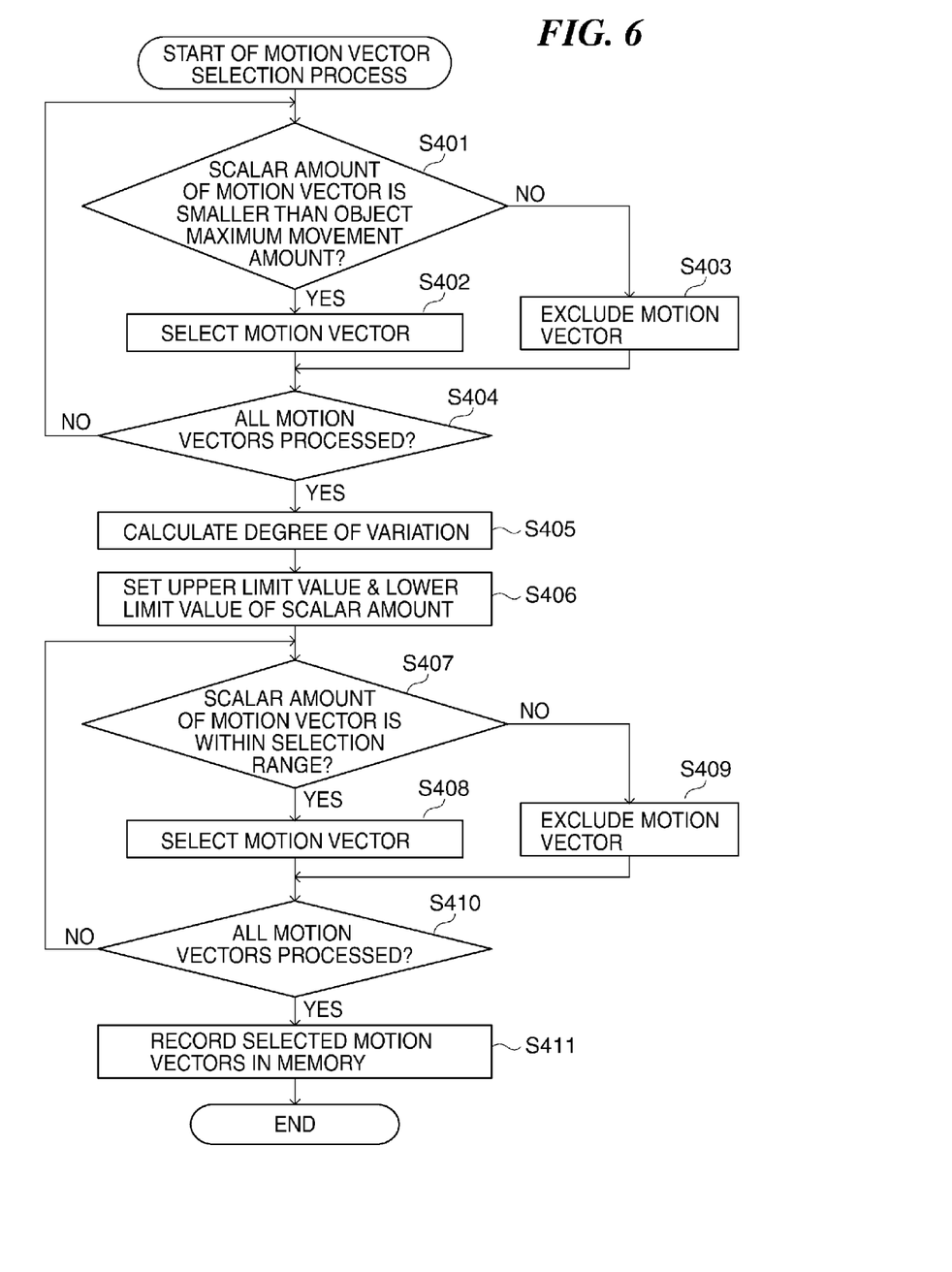
FIG. 6 is a flowchart of a motion vector selection process which is performed in a step of the shift correction amount calculation process in FIG. 3.

FIG. 6 is a flowchart of the motion vector selection process performed in the step S307 of the shift correction amount calculation process in FIG. 3.

At the start of the motion vector selection process, the system controller 50 calculates a scalar amount of one of the motion vectors detected in the step S306. Then, the system controller 50 compares the scalar amount of the one motion vector with the object maximum movement amount $Dist_{max}$ stored in the memory 32, and determines whether or not the scalar amount is smaller than the object maximum movement amount $Dist_{max}$ which is an estimated value (step S401).

If the scalar amount is smaller than the object maximum movement amount $Dist_{max}$ (YES to the step S401), the system controller 50 selects the one motion vector (step S402). On the other hand, if the scalar amount is not smaller than the object maximum movement amount $Dist_{max}$ (NO to the step S401), the system controller 50 excludes the one motion vector (step S403).

After execution of the step S402 or S403, the system controller 50 determines whether or not all motion vectors detected in the step S306 have been subjected to the selection processing (step S404). If all detected motion vectors have not been subjected to the selection processing (NO to the step S404), the system controller 50 returns to the step S401, and compares the scalar amount of the next motion vector with the object maximum movement amount $Dist_{max}$.

On the other hand, if all detected motion vectors have been subjected to the selection processing (YES to the step S404), the system controller 50 calculates a degree of variation in the scalar amount with respect to all of the selected motion vectors (step S405). For example, the system controller 50 calculates an average value of the scalar amounts of the selected motion vectors, calculates a standard deviation, and stores the calculated average value and standard deviation in the memory 32 as the degree of variation.

Figure 7A:
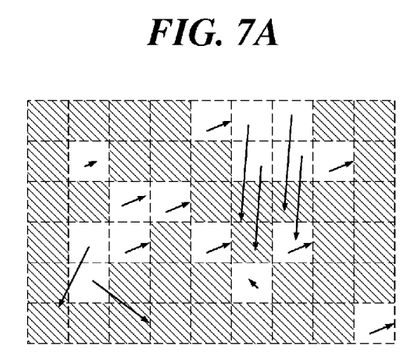
Figure 7B:
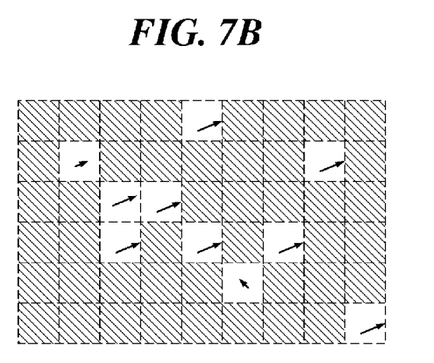
Figure 7C:
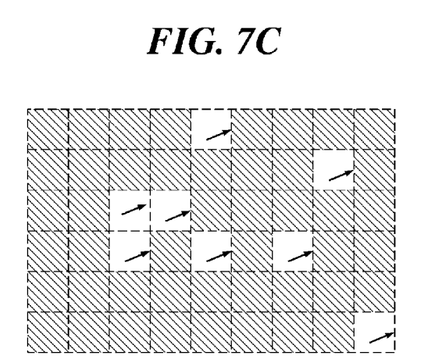

FIGS. 7A to 7C are diagrams useful in explaining the motion vector selection process performed by the camera 100 shown in FIG. 1. FIG. 7A shows a result of motion vector detection, FIG. 7B shows a result of motion vector selection using the object maximum movement amount, and FIG. 7C shows a result of motion vector selection using the degree of variation in the scalar amount in the motion vectors, which is performed further on the result of motion vector selection, shown in FIG. 7B.

Now, it is assumed that the result of motion vector detection, shown in FIG. 7A, has been obtained by executing the step S306 of the shift correction amount calculation process shown in FIG. 3. Further, it is assumed that the result of motion vector selection, shown in FIG. 7B, has been obtained by executing the steps S401 to S404 of the motion vector selection process in FIG. 6.

Figure 8A:
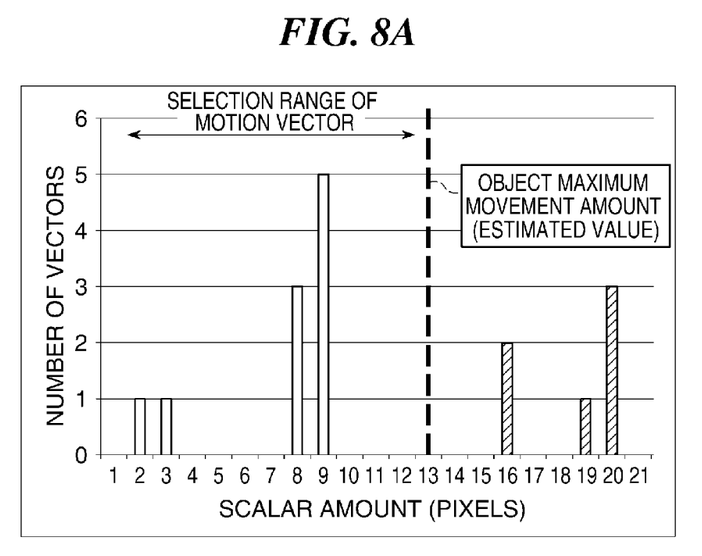
Figure 8B:
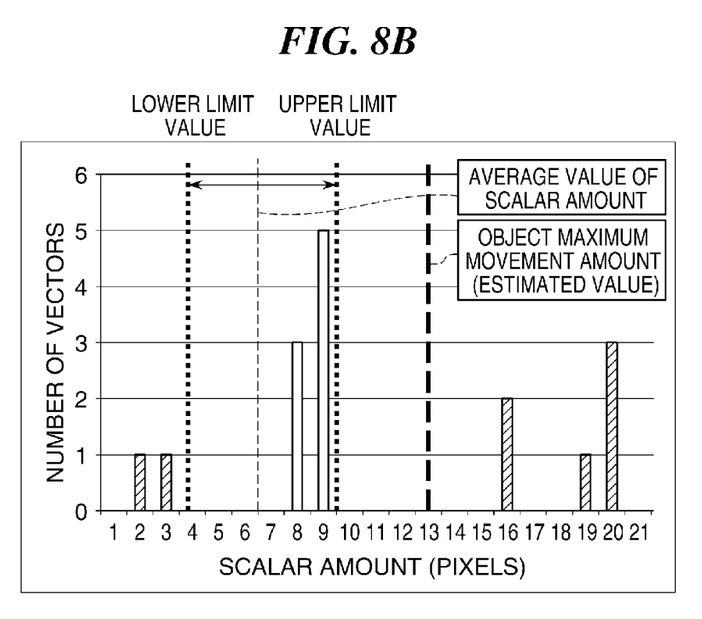

FIGS. 8A and 8B are diagrams useful in explaining selection ranges for selecting motion vectors when the motion vector selection process is performed by the camera 100 shown in FIG. 1. FIG. 8A shows a selection range of motion vectors, which is set by the object maximum movement amount, and FIG. 8B shows a selection range of motion vectors, which is set by the degree of variation in the scalar amount in the motion vectors.

In the steps S401 to S404, the motion vectors are selected according to the object maximum movement amount, and in these steps, if the scalar amount of a motion vector is smaller than the object maximum movement amount, the motion vector is selected. That is, in these steps, a motion vector having a scalar amount smaller than the object maximum movement amount is selected by setting the selection range (sorting range) of motion vectors as shown in FIG. 8A. This makes it easy to exclude a motion vector which is influenced by an external disturbance, such as noise and cloud.

Referring again to FIG. 6, after execution of the step S405, the system controller 50 sets an upper limit value and a lower limit value of the scalar amount of a motion vector to be used, based on the above-mentioned average value and standard deviation of the scalar amount (step S406). Then, the system controller 50 records the upper limit value and the lower limit value in the memory 32.

Here, as shown in FIG. 8B, the system controller 50 sets a first calculation value calculated by subtracting the standard deviation from the average value of the scalar amount as the lower limit value, and a second calculation value calculated by adding the standard deviation of the scalar amount to the average value as the upper limit value. Then, the system controller 50 sets a range defined by the upper limit value and the lower limit value as the selection range of motion vectors.

Then, the system controller 50 determines whether or not the scalar amount of a motion vector is within the thus set selection range (step S407).

If the scalar amount of a motion vector is within the selection range (YES to the step S407), the system controller 50 selects the motion vector (step S408). On the other hand, if the scalar amount of a motion vector is out of the selection range (NO to the step S407), the system controller 50 excludes the motion vector (step S409).

In the steps S407 to S409, as shown in FIG. 8B, it is possible to select a motion vector which is close to the movement of the object by using the degree of variation. This makes it easy to exclude a motion vector which is influenced by an external disturbance, such as noise and cloud.

After execution of the step S408 or S409, the system controller 50 determines whether or not all motion vectors selected in the steps S401 to S404 have been subjected to the selection processing (step S410). If all motion vectors have not been subjected to the selection processing (NO to the step S410), the system controller 50 returns to the step S407, and determines whether or not the scalar amount of the next motion vector is within the selection range defined by the upper limit value and the lower limit value.

On the other hand, if all motion vectors have been subjected to the selection processing (YES to the step S410), the system controller 50 records the motion vectors which have been finally selected in the memory 32 (step S411), and terminates the motion vector selection process.

By performing the motion vector selection process as described above, the motion vector selection result shown in FIG. 7C, for example, is obtained.

Referring again to FIG. 3, after the motion vectors have been selected in the step S307, the system controller 50 counts the number of selected motion vectors. Then, the system controller 50 determines whether or not the number of selected motion vectors is larger than a third threshold value $NV_{TH}$ set in advance (step S308). If the number of selected motion vectors is not larger than the third threshold value $NV_{TH}$ (NO to the step S308), the system controller 50 judges that the shift correction amount calculation process has failed, and terminates the shift correction amount calculation process.

On the other hand, if the number of selected motion vectors is larger than the third threshold value $NV_{TH}$ (YES to the step S308), the system controller 50 performs unification of the motion vectors (step S309). Here, the system controller 50 calculates the movement of the target image data item with respect to the reference image data item according to the selected motion vectors. For example, the system controller 50 expresses the movement of the target image using affine coefficients.

Now, assuming that (x, y) represents coordinates of a pixel of interest of the reference image data item, and (x', y') represents coordinates on the target image data item, corresponding to the pixel of interest, the coordinates (x', y') are expressed by the following equation (5) using the affine coefficients (a, b, c, d) in affine transformation:

$$\begin{bmatrix} x' \\ y' \end{bmatrix} = \begin{bmatrix} a & b \\ -b & a \end{bmatrix} \begin{bmatrix} x \\ y \end{bmatrix} + \begin{bmatrix} c \\ d \end{bmatrix} \quad (5)$$

The system controller 50 calculates the affine coefficients using at least three motion vectors of a plurality of motion vectors. Then, the system controller 50 calculates an error E of the motion vector using the calculated affine coefficients by the following equation (6):

$$E = \Sigma_i(ax_i+by_i+c-x'_i)^2 + \Sigma_i(-bx_i+ay_i+d-y'_i)^2 \quad (6)$$

Then, the system controller 50 performs the above-described process a predetermined number of times by changing the manner of motion vector selection to thereby determine affine coefficients which give the largest number of motion vectors from which errors not larger than the error E are calculated. Then, the system controller 50 determines the affine coefficients thus calculated as the shift correction amount, and stores the affine coefficients in the memory 32, followed by terminating the shift correction amount calculation process.

As described above, in the present embodiment, the detected motion vectors are limited by the magnitude of the motion vector which can be assumed by an object according to the exposure interval and the focal length, to thereby select motion vectors to be used in shift correction. As a result, it is possible to synthesize a plurality of images by accurately performing image shift correction even in a photographing scene having a lot of external disturbances, such as noise.

Although in the above-described embodiment, the description has been given by taking the digital camera as an example, the present embodiment can also be applied to an apparatus, such as a PC, which performs synthesis processing of a plurality of images by correcting a shift between the images.

As is clear from the above description, in the example shown in FIG. 1, at least the image processor 24 and the system controller 50 form the image processing device. Further, the system controller 50 and the image processor 24 function as a detection unit, a selection unit, and a synthesis unit. Further, the photographic lens 103, the shutter 101, the image pickup section 22, and the analog-to-digital converter 24 function as an image pickup unit, and the system controller 50 functions as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-205398 filed Oct. 6, 2014, which is hereby incorporated by reference herein in its entirety.

What is claimed is:

1. An image processing device that synthesizes a plurality of images obtained by photographing an object that moves at a predetermined speed to thereby obtain a synthesized image, comprising:
    a detection unit configured to divide each of the plurality of images into a plurality of blocks, and detect a motion vector from each of the blocks;
    a selection unit configured to estimate an object maximum movement amount indicative of a maximum amount of a movement amount of the object between the plurality of images based on a focal length and an exposure interval which are applied when each of the plurality of images is obtained, and to select motion vectors having a scalar amount smaller than the object maximum movement amount; and
    a synthesis unit configured to perform synthesis processing by aligning the plurality of images based on motion vectors selected by said selection unit to thereby obtain the synthesized image.

2. The image processing device according to claim 1, wherein said detection unit selects a block in which a total sum of signal levels of edges extracted from each of the blocks is larger than a first threshold value set in advance, as a feature block, and detects the motion vector with respect to the feature block.

3. The image processing device according to claim 2, wherein when the number of feature blocks is larger than a second threshold value set in advance, said detection unit detects the motion vector with respect to each feature block.

4. The image processing device according to claim 1, wherein said selection unit calculates a degree of variation in a scalar amount in all of the motion vectors, and selects the motion vectors based on the degree of variation.

5. The image processing device according to claim 4, wherein the degree of variation is an average value and a standard deviation of the scalar amount.

6. The image processing device according to claim 5, wherein said selection unit sets a selection range for selecting the motion vectors based on the average value and the standard deviation, and selects a motion vector having a scalar amount within the selection range.

7. The image processing device according to claim 1, wherein said selection unit calculates a degree of variation in the scalar amount in all of the motion vectors selected based on the object maximum movement amount, and further selects motion vectors, from the motion vectors selected based on the object maximum movement amount, based on the calculated degree of variation.

8. The image processing device according to claim 7, wherein the degree of variation is an average value and a standard deviation of the scalar amount.

9. The image processing device according to claim 8, wherein said selection unit sets a selection range for selecting the motion vectors based on the average value and the standard deviation, and selects a motion vector having a scalar amount within the selection range.

10. The image processing device according to claim 1, wherein the object is a star in the sky.

11. An image pickup apparatus comprising:
an image pickup unit configured to photograph an object that moves at a predetermined speed to thereby obtain a plurality of images;
an image processing device configured to synthesize the plurality of images to thereby obtain a synthesized image; and
a recording unit configured to record the synthesized image obtained by said image processing device in a memory,
wherein said image processing device includes:
a detection unit configured to divide each of the plurality of images into a plurality of blocks, and detect a motion vector from each of the blocks;
a selection unit configured to estimate an object maximum movement amount indicative of a maximum amount of a movement amount of the object between the plurality of images based on a focal length and an exposure interval which are applied when each of the plurality of images is obtained, and to select a motion vector having a scalar amount smaller than the object maximum movement amount; and
a synthesis unit configured to perform synthesis processing by aligning the plurality of images based on motion vectors selected by said selection unit to thereby obtain the synthesized image.

12. A method of controlling an image processing device that synthesizes a plurality of images obtained by photographing an object that moves at a predetermined speed to thereby obtain a synthesized image, comprising:
dividing each of the plurality of images into a plurality of blocks, and detecting a motion vector from each of the blocks;
estimating an object maximum movement amount indicative of a maximum amount of a movement amount of the object between the plurality of images based on a focal length and an exposure interval which are applied when each of the plurality of images is obtained;
selecting a motion vector having a scalar amount smaller than the object maximum movement amount; and
performing synthesis processing by aligning the plurality of images based on motion vectors selected by said selecting to thereby obtain the synthesized image.

13. A non-transitory computer-readable storage medium storing a computer-executable program for executing a method of controlling an image processing device that synthesizes a plurality of images obtained by photographing an object that moves at a predetermined speed to thereby obtain a synthesized image, wherein the method comprises:
dividing each of the plurality of images into a plurality of blocks, and detecting a motion vector from each of the blocks;
estimating an object maximum movement amount indicative of a maximum amount of a movement amount of the object between the plurality of images based on a focal length and an exposure interval which are applied when each of the plurality of images is obtained;
selecting a motion vector having a scalar amount smaller than the object maximum movement amount; and
performing synthesis processing by aligning the plurality of images based on motion vectors selected by said selecting to thereby obtain the synthesized image.

* * * * *